United States Patent
Szilágyi

(10) Patent No.: US 11,252,546 B2
(45) Date of Patent: Feb. 15, 2022

(54) RECEIVING VEHICULAR COMMUNICATION MESSAGES

(71) Applicant: NOKIA SOLUTIONS AND NETWORKS OY, Espoo (FI)

(72) Inventor: Péter Szilágyi, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/984,274

(22) Filed: Aug. 4, 2020

(65) Prior Publication Data

US 2021/0058752 A1 Feb. 25, 2021

(30) Foreign Application Priority Data

Aug. 23, 2019 (FI) .................................... 20195698

(51) Int. Cl.
| | |
|---|---|
| *H04W 4/40* | (2018.01) |
| *H04W 4/46* | (2018.01) |
| *H04L 29/06* | (2006.01) |
| *H04W 4/06* | (2009.01) |
| *H04W 28/06* | (2009.01) |
| *H04W 84/04* | (2009.01) |

(52) U.S. Cl.
CPC .............. *H04W 4/46* (2018.02); *H04L 69/22* (2013.01); *H04W 4/06* (2013.01); *H04W 28/065* (2013.01); *H04W 84/042* (2013.01)

(58) Field of Classification Search
None
See application file for complete search history.

(56) References Cited

U.S. PATENT DOCUMENTS

| 10,555,363 | B2* | 2/2020 | Park ..................... H04W 4/06 |
| 10,631,275 | B2* | 4/2020 | Kim .................. H04W 72/0406 |
| 2017/0188406 | A1* | 6/2017 | Baligh ................. H04W 40/16 |
| 2017/0289990 | A1* | 10/2017 | Kaushik ............... H04L 5/0055 |
| 2018/0242385 | A1 | 8/2018 | Chandramouli et al. |
| 2018/0367958 | A1* | 12/2018 | Dizdarevic ........... G08G 1/091 |
| 2019/0037448 | A1* | 1/2019 | Shan ..................... H04W 4/48 |
| 2019/0132709 | A1 | 5/2019 | Graefe et al. |

(Continued)

FOREIGN PATENT DOCUMENTS

| CN | 107683613 A | 2/2018 |
| CN | 108029099 A | 5/2018 |
| EP | 3499785 A1 | 6/2019 |
| JP | 2011-023021 A | 2/2011 |

(Continued)

OTHER PUBLICATIONS

Office Action dated Nov. 22, 2019 corresponding to Finnish Patent Application No. 20195698.

(Continued)

*Primary Examiner* — Ajit Patel
(74) *Attorney, Agent, or Firm* — Squire Patton Boggs (US) LLP

(57) ABSTRACT

There is provided a solution for capturing vehicle-to-vehicle messages in a cellular communication system. According to an aspect, a method comprises capturing, by an access node of a cellular communication system, a broadcast message transmitted by a vehicular terminal device; and forwarding contents of the captured broadcast message to an application server via a network of the cellular communication system and according to a forwarding rule.

15 Claims, 8 Drawing Sheets

(56) References Cited

U.S. PATENT DOCUMENTS

| | | | |
|---|---|---|---|
| 2019/0141536 A1* | 5/2019 | Bachmutsky | H04L 67/10 |
| 2019/0239186 A1* | 8/2019 | Tugnawat | H04W 88/06 |
| 2019/0253852 A1 | 8/2019 | Boström et al. | |
| 2019/0261191 A1* | 8/2019 | Nakano | H04W 16/26 |
| 2019/0306677 A1* | 10/2019 | Basu | H04W 4/027 |
| 2020/0105131 A1* | 4/2020 | Carter | H04W 88/16 |
| 2020/0106624 A1* | 4/2020 | Russell | H04L 67/12 |
| 2020/0280827 A1* | 9/2020 | Fechtel | H04W 4/44 |

FOREIGN PATENT DOCUMENTS

| | | |
|---|---|---|
| JP | 2017-068335 A | 4/2017 |
| JP | 2018-020725 A | 2/2018 |
| WO | 2017/159242 A1 | 9/2017 |
| WO | WO 2018/125686 A2 | 7/2018 |
| WO | WO 2019/104280 A1 | 5/2019 |
| WO | WO 2019/109005 A1 | 6/2019 |

OTHER PUBLICATIONS

Finnish Search Report dated Nov. 22, 2019 corresponding to Finnish Patent Application No. 20195698.

Communication of Acceptance under section 29a of Patents Decree dated Apr. 8, 2020 corresponding to Finnish Patent Application No. 20195698.

European Search Report dated Oct. 19, 2020 corresponding to European Patent Application No. 20189145.4.

Notice of Reasons for Rejection issued in corresponding Japanese Patent Application No. 2020-139268 dated Jan. 22, 2021, with English summary thereof.

Second Office Action issued in corresponding Japanese Patent Application No. 2020-139268 dated Jun. 28, 2021, with English summary thereof.

First Office Action issued in corresponding Chinese Patent Application No. 2020107891591 dated Jul. 26, 2021, with English summary thereof.

* cited by examiner

001
RECEIVING VEHICULAR COMMUNICATION MESSAGES

TECHNICAL FIELD

The invention relates to a mobile communication network provided with capability of processing vehicular communication messages.

BACKGROUND

Vehicular communication systems refer to networks in which vehicles and road-side units (RSU) represent the communicating nodes, providing each other with information on safety warnings and traffic congestion, for example. Deploying local warning systems through vehicular communications enables eliminating the excessive cost of traffic collisions. Vehicle-to-vehicle (V2V) technology refers to an automobile technology that allows vehicles to communicate with each other. V2V may also be referred to as a vehicular ad hoc network (VANET). The vehicular ad hoc networks may be formed by cars, and used for a variety of applications including safety, navigation, and law enforcement.

Vehicle-to-everything (V2X) communication is a generalization of V2V. V2X covers other forms of vehicular communication, e.g. vehicle-to-network (V2N), vehicle-to-pedestrian (V2P), and vehicle-to-device (V2D).

EP 3 499 785 discloses a fifth-generation wireless communications network that includes a server node, radio network equipment and a wireless device. In an example method, a server node receives first user data in response to (i) the wireless device receiving from the radio network equipment information indicating a plurality of uplink access configurations, each uplink access configuration including a random access configuration; (ii) the wireless device receiving an uplink access configuration index; (iii) the wireless device using the uplink access configuration index to identify an uplink access configuration from among the indicated plurality of uplink access configurations, and (iv) the wireless device transmitting the first user data to the wireless communications network according to the identified uplink access configuration. In the example method, further, the server node initiates transmission of second and third user data. This causes the wireless device to (v) receive from the radio network equipment, in a first downlink subframe, a first OFDM transmission formatted according to a first numerology and carrying the second user data, and (vi) receive from the radio network equipment, in a second downlink subframe, a second OFDM transmission formatted according to a second numerology and carrying the third user data, wherein the numerologies have different sub carrier spacings.

WO 2018/125686 discloses a communication device that can include a processor configured to receive, on a radio channel, an uplink radio transmission in a first waveform format from a terminal device that instructs the communication device to forward the uplink radio transmission to a network access node, and transmit, on the radio channel, the uplink radio transmission to the network access node with a preamble in a second waveform format to protect the uplink radio transmission from collisions.

BRIEF DESCRIPTION

According to an aspect, there is provided the subject matter of the independent claims. Some embodiments are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: operating functions of an access node of a cellular communication system; capturing a broadcast message transmitted by a vehicular terminal device; and forwarding contents of the captured broadcast message to an application server via a network of the cellular communication system and according to a forwarding rule.

In an embodiment, the means are configured to establish a virtual terminal device in the access node and to capture the broadcast message by using the virtual terminal device.

In an embodiment, the virtual terminal device is configured to process different protocol messages than the access node.

In an embodiment, the virtual terminal device supports at least one of an IEEE 802.11p based protocol and a 3GPP PC5-based protocol.

In an embodiment, the virtual terminal device comprises a first protocol stack for capturing the broadcast message and a second protocol stack for communicating with the application server.

In an embodiment, the means are configured to remove at least one header of the captured broadcast message, to determine a destination address for the contents of the captured broadcast message from a forwarding database storing the forwarding rule, and to generate an internet protocol packet comprising the contents of the captured broadcast message as a payload and further comprising an internet protocol header comprising the determined destination address.

In an embodiment, the means are further configured to establish a protocol data unit, PDU, session with a user plane function of the cellular communication system, wherein the PDU session is dedicated for transporting captured broadcast messages of vehicular terminal devices, and to forward the contents of the captured broadcast message to the application server over the PDU session.

In an embodiment, the means are configured to skip performing radio resource setup when establishing the PDU session but to indicate to the user plane function that the radio resource setup has been completed.

In an embodiment, the means are configured to receive configuration data comprising at least said forwarding rule and to set up said capturing and forwarding according to the configuration data.

In an embodiment, the configuration data further specifies at least one limitation to broadcast messages to be captured and forwarded, and wherein the means are configured to forward only broadcast messages complying with the at least one limitation and to not forward a broadcast message not complying with the at least one limitation.

In an embodiment, the means are configured to receive payload data from the application server and to transmit the payload data in a vehicle-to-vehicle broadcast message.

In an embodiment, the means comprises at least one processor and at least one memory including a computer program code, wherein the at least one memory and the computer program code are configured, with the at least one processor, to cause the performance of the apparatus.

According to an aspect, there is provided a system comprising means for performing: generating a forwarding rule defining how to forward contents of captured broadcast messages to an application server via a network of a cellular communication system; configuring an access node of the cellular communication system by using the forwarding rule; and receiving, from the access node, contents of a broadcast message transmitted by a vehicular terminal device and captured by the access node.

In an embodiment, the means comprises at least one processor and at least one memory including a computer program code, wherein the at least one memory and the computer program code are configured, with the at least one processor, to cause the performance of the apparatus.

According to an aspect, there is provided a method comprising: capturing, by an access node of a cellular communication system, a broadcast message transmitted by a vehicular terminal device; and forwarding contents of the captured broadcast message to an application server via a network of the cellular communication system and according to a forwarding rule.

In an embodiment, the access node establishes a virtual terminal device in the access node and captures the broadcast message by using the virtual terminal device.

In an embodiment, the virtual terminal device processes different protocol messages than the access node.

In an embodiment, the virtual terminal device supports at least one of an IEEE 802.11p based protocol and a 3GPP PC5-based protocol.

In an embodiment, the virtual terminal device comprises a first protocol stack for capturing the broadcast message and a second protocol stack for communicating with the application server.

In an embodiment, the access node removes at least one header of the captured broadcast message, determines a destination address for the contents of the captured broadcast message from a forwarding database storing the forwarding rule, and generates an internet protocol packet comprising the contents of the captured broadcast message as a payload and further comprising an internet protocol header comprising the determined destination address.

In an embodiment, the access node establishes a protocol data unit, PDU, session with a user plane function of the cellular communication system, wherein the PDU session is dedicated for transporting captured broadcast messages of vehicular terminal devices, and forwards the contents of the captured broadcast message to the application server over the PDU session.

In an embodiment, the access node skips performing radio resource setup when establishing the PDU session but indicates to the user plane function that the radio resource setup has been completed.

In an embodiment, the access node receives configuration data comprising at least said forwarding rule and sets up said capturing and forwarding according to the configuration data.

In an embodiment, the configuration data further specifies at least one limitation to broadcast messages to be captured and forwarded, and wherein the access node forwards only broadcast messages complying with the at least one limitation and does not forward a broadcast message not complying with the at least one limitation.

In an embodiment, the access node receives payload data from the application server and transmits the payload data in a vehicle-to-vehicle broadcast message.

According to an aspect, there is provided a method carried out in a cellular communication system, the method comprising: generating a forwarding rule defining how to forward contents of captured broadcast messages to an application server via a network of the cellular communication system; configuring an access node of the cellular communication system by using the forwarding rule; and receiving, from the access node, contents of a broadcast message transmitted by a vehicular terminal device and captured by the access node.

According to an aspect, there is provided a computer program comprising a computer program code embodied on a distribution medium readable by a computer that, when executed by the computer, configures the computer carry out a computer process comprising all the steps of any one of the above-described methods.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PC5), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
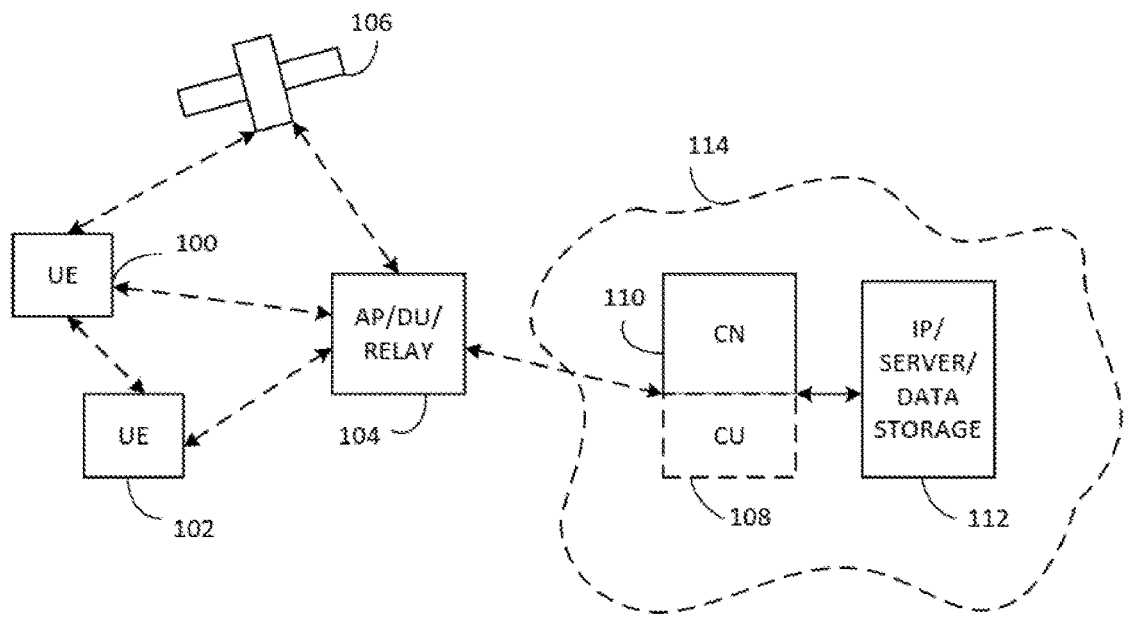
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The physical link from a user device to a (e/g)NodeB is called uplink (UL) or reverse link and the physical link from the (e/g)NodeB to the user device is called downlink or forward link. It should be appreciated that (e/g)NodeBs or their functionalities may be implemented by using any node, host, server or access point etc. entity suitable for such a usage. Said node 104 may be referred to as network node 104 or network element 104 in a broader sense.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a user plane function (UPF) (this may be 5G gateway corresponding to serving gateway (S-GW) of 4G) or access and mobility function (AMF) (this may correspond to mobile management entity (MME) of 4G).

The user device 100, 102 (also called UE, user equipment, user terminal, terminal device, mobile terminal, etc.) illustrates one type of an apparatus to which resources on the air interface are allocated and assigned, and thus any feature described herein with a user device may be implemented with a corresponding apparatus, such as a part of a relay node. An example of such a relay node is an integrated access and backhaul (IAB)-node (a.k.a. self-backhauling relay).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink-only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments mobile terminal (MT) part of the relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices may have one or more antennas. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being applicable to existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. MEC covers a wide range of technologies such as wireless sensor networks, mobile data acquisition, mobile signature analysis, cooperative distributed peer-to-peer ad hoc networking and processing, autonomous vehicles, traffic safety, real-time analytics, time-critical control, and healthcare applications. A basic concept of the MEC is that application level cloud-computing capabilities, information technology services, etc. are provided at the edge of the mobile communication network. The edge refers to the radio access network and/or other network elements closer to the terminal devices than a core network 110 or the application servers 112 in FIG. 1. The MEC is characterized by ultra-low latency and high bandwidth as well as real-time access to radio network information that can be leveraged by applications. According to the MEC concept, a mobile network operator may open the radio access network edge to authorized third-parties, allowing them to flexibly and rapidly deploy innovative applications and services towards mobile subscribers, enterprises and vertical segments. Applications that may benefit of the MEC include video analytics, location-based services, Internet-of-Things (IoT), augmented reality, local content distribution, data caching, and automotive applications. The MEC allows software applications to access local content and real-time information about local access network conditions. The MEC may also reduce the traffic between the radio access network and the core network by performing the high-level application processing close to the terminal devices.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side and non-real time functions being carried out in a centralized manner.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
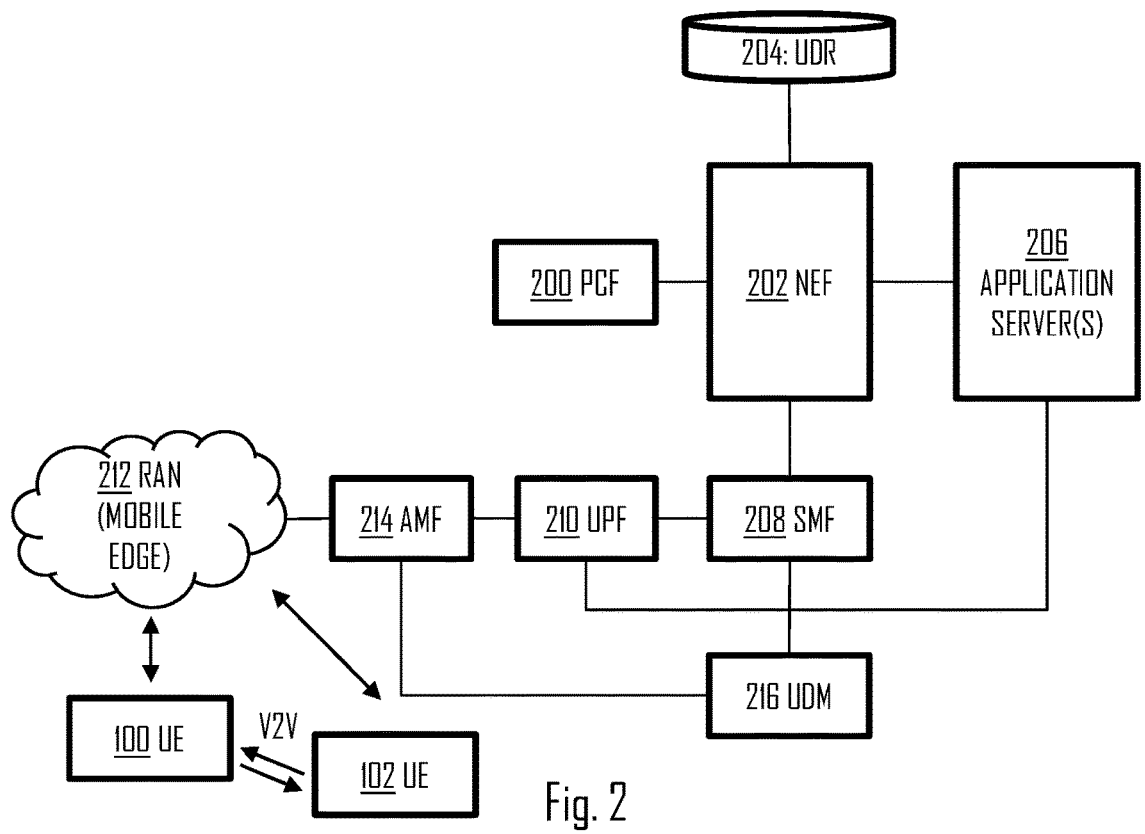
FIG. 2 illustrates elements of a mobile communication network to which embodiments of the invention may be applied.

FIG. 2 illustrates a block diagram of some network elements and their interconnections in a 5G mobile communication network. Referring to FIG. 2, the terminal device 100 (UE) is connected to a radio access network 212 illustrated by the cloud in FIG. 2. The radio access network may comprise or be comprised in the multi-access edge or mobile edge of the mobile communication network that performs the multi-access edge computing. The multi-access edge may comprise one or a plurality of the following network elements: various access nodes of the radio access network 212 including fixed and mobile base stations, radio network controllers of the 5G system for interconnection with other radio access technologies such as WiFi (IEEE 802.11 networks), cable modem termination systems (CMTS), terminals of optical networks, access points for other wireless networks such as Zigbee, WiFi, or MuLTE-fire, routers, and switches. Virtually any network element in the radio access network (RAN) or closer to the terminal device than the core network 110 and having application data processing capability may be harnessed for the multi-access edge computing.

The radio access network is connected to a user plane function (UPF) 210 that serves as an anchor point for protocol data unit (PDU) sessions established with the terminal devices. The UPF provides data packet routing and quality-of-service (QoS) management functions, for instance. The UPF is controlled by a session management function (SMF) 208 that provides traffic steering configurations for the UPF 210 for proper traffic routing. The SMF also performs session management including session establishment, modification, and release, UE internet protocol (IP) address allocation & management and other Dynamic Host Configuration Protocol (DHCP) functions, terminate non-access stratum (NAS) signaling that is related to session management, etc.

An access and mobility management function (AMF) 214 may manage mobility of terminal devices. The network may comprise many AMF instances. The AMF may terminate a RAN control plane and implement ciphering and integrity protection algorithms. From a perspective, the AMF carries out some tasks similar to those of a mobility management entity (MME) of an LTE system.

A policy control function (PCF) 200 is responsible for a unified policy framework that governs behavior of the mobile communication network. The PCF provides policy rules to user plane and control plane functions. The PCF may access a unified data repository 204 (UDR) when creating or modifying policies. The UDR 204 stores, for example subscriber information related to the terminal devices, and it may define some preferences of the subscription that may affect the policies decided by the PCF. A network exposure function (NEF) 202 provides an adaptation or exposure function that enables secure exposure of services and features between the 5G core network elements (e.g. the PCF and UPF) and application server(s) 206. The NEF 202 may mediate information on capabilities and events between the core network elements and the application servers, provide a translation function for the information in a form of an application programming interface (API). The NEF 202 may be described as service-aware border gateway that enables application servers or functions external to the 5G core network to communicate with the network elements of the core network.

A user plane connection may also be provided between the UPF 210 and the application server(s) 206 for the purpose of transferring application data.

A unified data management (UDM) function performs tasks similar to a home subscriber server (HSS) function of the LTE networks. Such procedures include generation of authentication and key agreement (AKA) credentials, UE or user identification, access authorization, and subscription management.

In V2V communications, vehicular terminal devices transmit messages directly to one another. FIG. 2 illustrates a V2V link between the UEs 100, 102. Additionally, the vehicular UEs 100, 102 may connect to the RAN 212 over cellular connections, e.g. a LTE or 5G radio resource control (RRC) connection. The V2V link may support a communication protocol different from a communication protocol of cellular connections. Examples of the V2V communication protocols include IEEE 802.11p protocol and a PC5 protocol. The 802.11p is in some literature called direct or dedicated short-range communication (DSRC). Because of the different protocols, a conventional access node of a cellular communication system cannot receive or detect the V2V messages exchanged between the vehicular UEs 100, 102. Similar characteristics may apply to some other V2X communications, e.g. V2P. It might, however, be beneficial to acquire information contained in such V2X messages in the cellular network. The V2X messages may carry information on traffic, accidents, alerts, etc. that could be used for configuring the cellular communication system.

Figure 3:
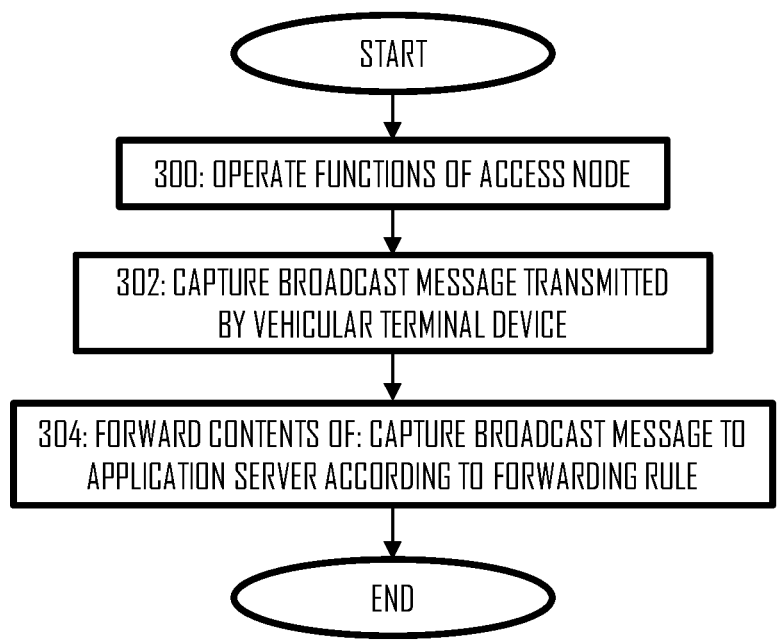
FIG. 3 illustrates an embodiment for capturing and forwarding vehicular broadcast messages.
Figure 4:
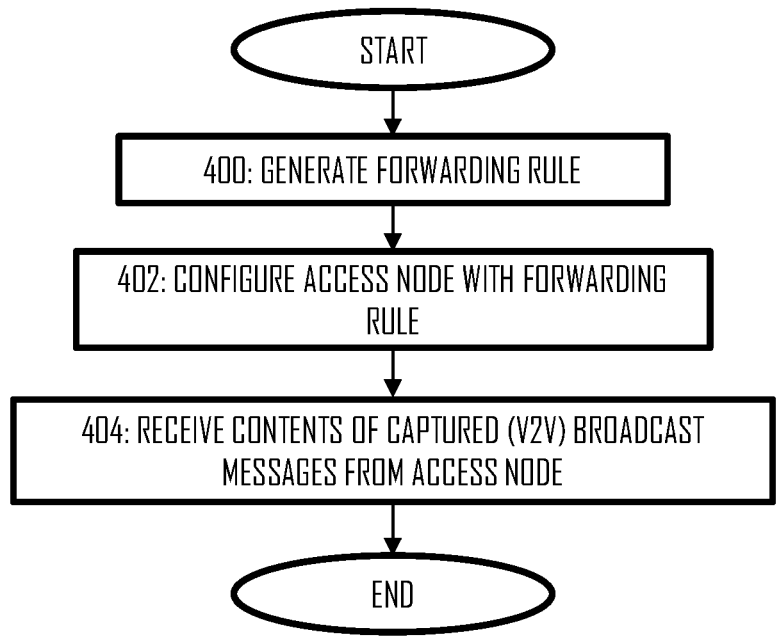
FIG. 4 illustrates an embodiment of a procedure for configuring vehicular broadcast message forwarding.

FIGS. 3 and 4 illustrate some embodiments for configuring an access node of the cellular communication system to capture the V2X messages exchanged directly between the vehicular UEs 100, 102. FIG. 3 illustrates a procedure for the access node while FIG. 4 illustrates a procedure for a system that configures the access node. The system may include one or more entities of the cellular communication network illustrated in FIG. 2.

Referring to FIG. 3, a process executed in the access node comprises: operating functions of an access node of a cellular communication system (block 300); capturing a broadcast message transmitted by a vehicular terminal device (block 302); and forwarding contents of the captured broadcast message to an application server via a network of the cellular communication system and according to a forwarding rule (block 304).

Referring to FIG. 4, a process executed in the cellular communication system comprises: generating a forwarding rule defining how to forward contents of captured broadcast messages to an application server via a network of the cellular communication system (block 400); configuring an access node of the cellular communication system by using the forwarding rule (402); and receiving (block 404), from the access node, contents of a broadcast message transmitted by a vehicular terminal device and captured by the access node.

The embodiments described above configure the access node(s) to capture the vehicular broadcast messages. By implementing the capability in the access nodes, design and installation of separate, dedicated capturing devices can be avoided or reduced, thus reducing operational expenses and complexity of the system.

The protocol used for transmitting and receiving the broadcast V2X messages may be designed for UEs, i.e. both the transmitter and the receiver of the V2X messages is designed to be the UE. Therefore, the conventional access node not supporting the UE protocol cannot detect the V2X messages. In an embodiment, the access node is configured to establish a virtual terminal device supporting the required protocol and to capture the broadcast message by using the virtual terminal device. The virtual terminal device may support one or more communication protocols of vehicular UEs.

In an embodiment, the virtual terminal device is configured to process different protocol messages than cellular connection management features of the access node. In other words, the access node may support at least two different protocol stacks: one for the virtual UE and one for the conventional access node features.

In an embodiment, the application server is a server of mobile edge computing. The application server may reside in a core network of the cellular communication system, or in a network beyond the core network from the perspective of the access node. The application server may be a physical server or a virtual server, or a cloud server.

Figure 5:
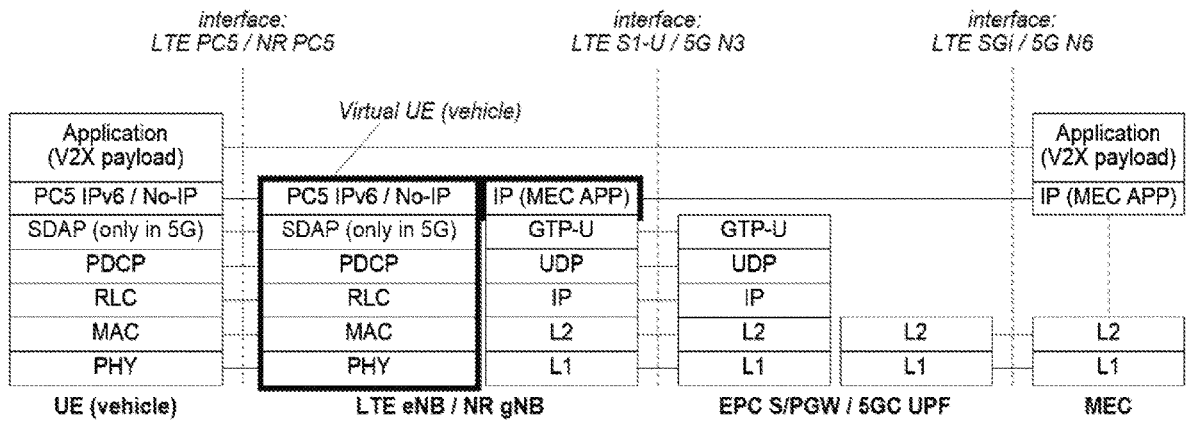
FIGS. 5 and 6 illustrate protocol stacks for an access node to operate a virtual terminal device entity according to some embodiments.
Figure 6:
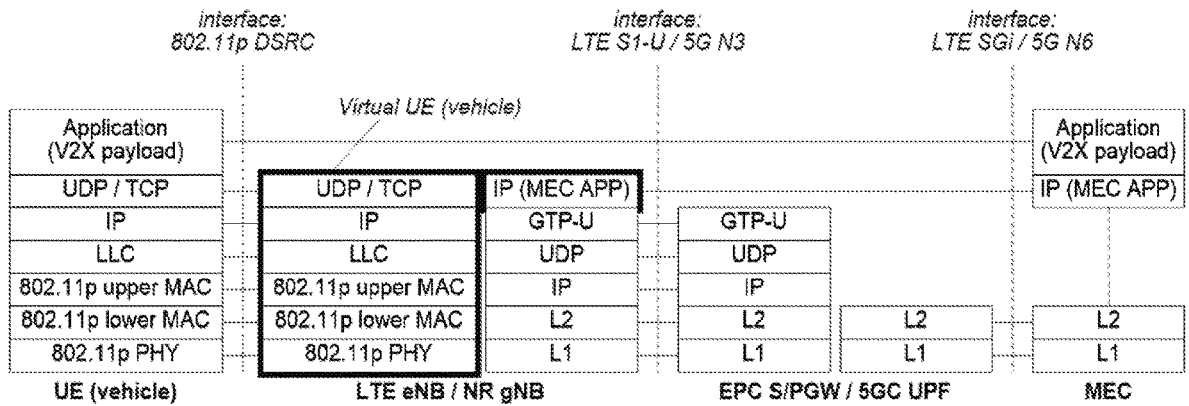

In an embodiment, the virtual terminal device supports at least one of an IEEE 802.11p based protocol and a 3GPP PC5-based protocol. FIGS. 5 and 6 illustrate protocol stacks according to these two embodiments. FIG. 5 illustrates a protocol stack for the access node supporting the PC5 while FIG. 6 illustrates a protocol stack for the access node supporting the IEEE 802.11p.

As illustrated in FIGS. 5 and 6, the virtual terminal device comprises a first protocol stack for capturing the broadcast message(s) and a second protocol stack for communicating with the application server. Let us next describe the protocol stacks in greater detail.

As illustrated in FIGS. 5 and 6, a vehicular UE supports a protocol stack of the PC5 protocol (FIG. 6) or an IEEE 802.11p protocol (FIG. 6). An application layer generates or processes V2X payload data transmitted/received through lower protocol layers used for delivering the V2X payload. Referring to FIG. 5, the lower protocol layers may include a PC5 internet protocol (IP) version 6 layer which is an optional layer. In 5g, there is further a service data adaptation protocol (SDAP) layer that performs mapping between a quality-of-service (QoS) flow and a data radio bearer. Below the SDAP, there are packet data convergence protocol (PDCP) layer performing tasks such as reordering and duplicate detection of data packets, ciphering, etc. Below the PDCP, a radio link control (RLC) layer manages tasks such as (re)segmentation of packets, error correction, etc. Below the RLC, a medium access control (MAC) layer performs tasks such as (de)multiplexing of data packets, error correction, padding, etc. Below the MAC, a physical layer performs modulation and transmission/reception of radio signals carrying the payload data. The virtual UE of the access node illustrated in FIG. 5 may include the same protocol layers as the real vehicular UE except for the application layer. The application layer may be provided in the application server to which the access node forwards the captured messages.

With respect to the second protocol stack for communicating with the application server, the access node may further include a protocol stack for delivering contents of the captured messages to the application server. The messages may be delivered via a UPF (5G) or a packet data network gateway (P-GW in the LTE). The UPF/P-GW may support certain protocol layers and, for the purpose of communicating with the UPF/P-GW, the access node may support the same protocol layers. The layers may include L1 (physical) and L2 (MAC) layers, an IP layer, a user datagram protocol (UDP) layer, and a general packet radio service tunneling protocol for user data (GTP-U). The UPF/P-GW may have another session established with the application server and a link between the two sessions so that the UPF/P-GW is capable of forwarding the messages to the application server (L1 and L2 between the application server and the UPF/P-GW). The application server may support an IP layer of a MEC application, and the access node may have the same layer (IP MEC APP). On top of the MEC IP layer, the application layer of the application server may then process the received payload of the captured messages.

Referring to FIG. 6, the protocol stacks supporting the IEEE 802.11p are similar, the only changes being in the layers of the UEs. The 802.11p builds on the radio interface of Wi-Fi networks and the physical and MAC layers have corresponding features. On top of the MAC layer, a logical link control (LLC) layer. The LLC may be a software module that unifies data interfacing to higher layers, and it may perform at least some functions that are similar to the RLC. On top of the LLC, UDP/TCP (transport control protocol)/IP layers may be provided.

As illustrated in FIGS. 5 and 6, the access node may terminate the protocol stack from the network towards the (virtual) UE. On the other hand, the virtual UE may be dedicated to receiving messages from other vehicular UEs. In such embodiments, radio transmission capabilities of the virtual UE may be disabled. In other embodiments, the virtual UE is configured to transmit at least some signaling messages. Data transmission capabilities may, however be disabled. The signaling messages may comprise messages that trigger the transmission of the broadcast message or that facilitate reception and capturing of the broadcast message.

When the transmission capabilities are disabled, no MAC address or a corresponding Layer 2 identity may be established for the virtual UE.

In another embodiment, also the data transmission capabilities of the virtual UE are enabled. This enables the application server and the MEC application to create and send V2X messages via the virtual UE in the access node. In this embodiment, the virtual UE configuration may comprise establishing the MAC identity for the virtual UE. In an embodiment, a vehicle/infrastructure identity may be established for the MEC application on the application layer in the application server that creates and originates the V2X messages.

Figure 7:
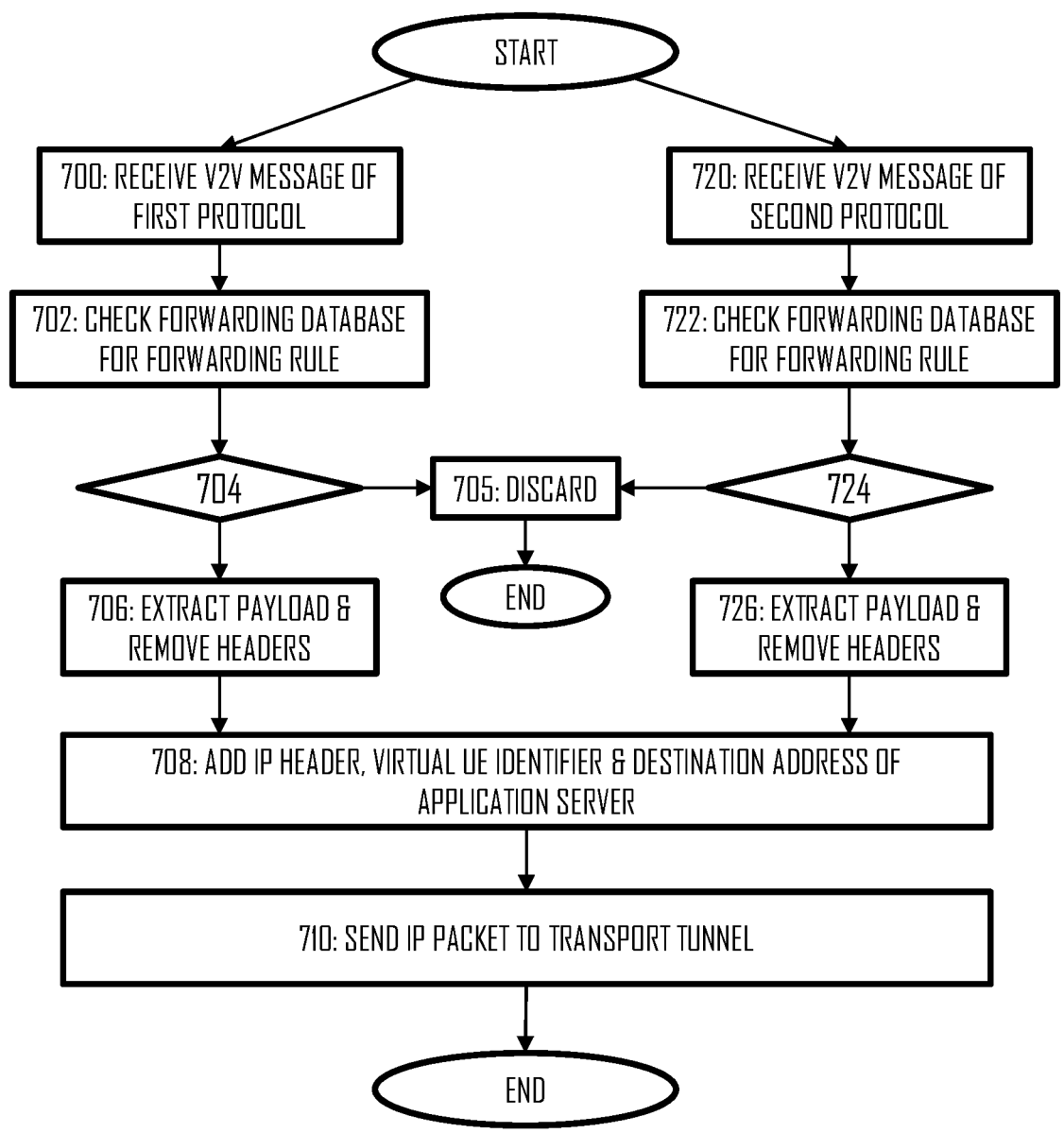
FIG. 7 illustrates a flow diagram for capturing V2V messages and determining forwarding policies for such messages according to an embodiment.

In an embodiment, the access node removes at least one header of the captured broadcast message, determines a destination address for the contents of the captured broadcast message from a forwarding database storing the forwarding rule, and generates an IP packet comprising the contents of the captured broadcast message as a payload and further comprising an IP header comprising the determined destination address. This may be carried out on the IP (MEC APP) layer. From there on, the IP packet may be forwarded to lower protocol layers for delivery to the UPF/P-GW. If the UPF/P-GW does not support the IP (MEC APP) layer, the destination address may be invisible to the UPF/S-GW. However, because of the mapping between the sessions, the UPF/S-GW is capable of forwarding the received packet towards the application server. The IP packet may further comprise an identifier of the virtual UE that captured the broadcast message. FIG. 7 illustrates an embodiment of such a procedure for the two different protocol stacks, e.g. the PC5 and 802.11p.

Referring to FIG. 7, the access node receives (captures) a packet from a vehicular UE via the PC5 interface (block 700) or from the 802.11p interface (block 720). As the packet is broadcasted by the vehicular UE and the access node acts as a vehicular UE itself through the virtual UE, the access node has access to the packet. The received packet contains a V2X payload, a protocol header that is of type PC5 protocol header (block 700) or protocol headers of type 802.11p (block 720). Next, the access node checks the forwarding database to for an entry registered to receive V2V messages of the detected protocol type (block 702/722). If no such entry is found, the V2V message is discarded (block 705) and the procedure ends. If a forwarding rule has been registered for the V2V message of the detected protocol type, the access node removes all protocol headers up to and including the PC5 header (block 706) or the 802.11p headers (block 726), retaining only the V2X payload of the packet. Next, the access node may prepare the V2X payload to be transferred to the designated recipient(s) defined by the forwarding rule, e.g., the application server deployed at or beyond a core network of the cellular communication system. The recipient may be indicated in forwarding database entries associated with the original protocol type of the V2V message (PC5 or 802.11p). Accordingly, the access node may generate an IP packet towards the/each recipient with the destination IP address set to the IP address of the designated recipient (block 708). Now with the IP header inserted in front of the V2X payload, the packet has been prepared for transmission to the designated receivers. Next, the access node may further prepare the IP packet to be sent to the core network. This is achieved by encapsulating the packets in a GTP-U/UDP/IP stack and sending the encapsulated IP packet to a transport tunnel previously established between the access node and the UPF/P-GW for transferring V2V packets. The establishment of the tunnel is a separate procedure illustrated in FIG. 8. In block 710, the IP packet is sent to the transport tunnel to the UPF/P-GW.

Referring to steps 704 and 724, the access node may be configured with at least one limitation to broadcast messages to be captured and forwarded. The limitation(s) may specify what type of V2V messages shall be captured and forwarded. As a consequence, the access node may forward (blocks 708 and 710) only broadcast messages complying with the at least one limitation and not forward (block 705) a broadcast message not complying with the at least one limitation. The limitations may specify, for example, a set of vehicular UEs from which the messages shall be captured, a type of messages to be captured (e.g. messages carrying traffic information or alerts), etc. As a consequence, even though the access node is capable of detecting and capturing various messages, it may forward only a subset of the captured messages, according to the limitations.

The access node may enable only one or both parallel branches of FIG. 7, wherein one branch is formed by blocks 700 to 706 and the other branch by blocks 720 to 726. In other words, if the access node is configured to establish a virtual UE supporting the first protocol stack, the access node may enable blocks 700 to 706 and, otherwise, disable the branch. Similarly, if the access node is configured to establish a virtual UE supporting the first protocol stack, the access node may enable blocks 720 to 726 and, otherwise, disable the branch. When both branches are enabled, the access node may run the branches in parallel processes, e.g. the access node may capture concurrently messages through both protocol stacks. A dedicated transport tunnel and PDU session may be established with the UPF/P-GW for each protocol stack, or the protocol stacks may employ the common PDU session and the transport tunnel with the UPF/P-GW.

Figure 8:
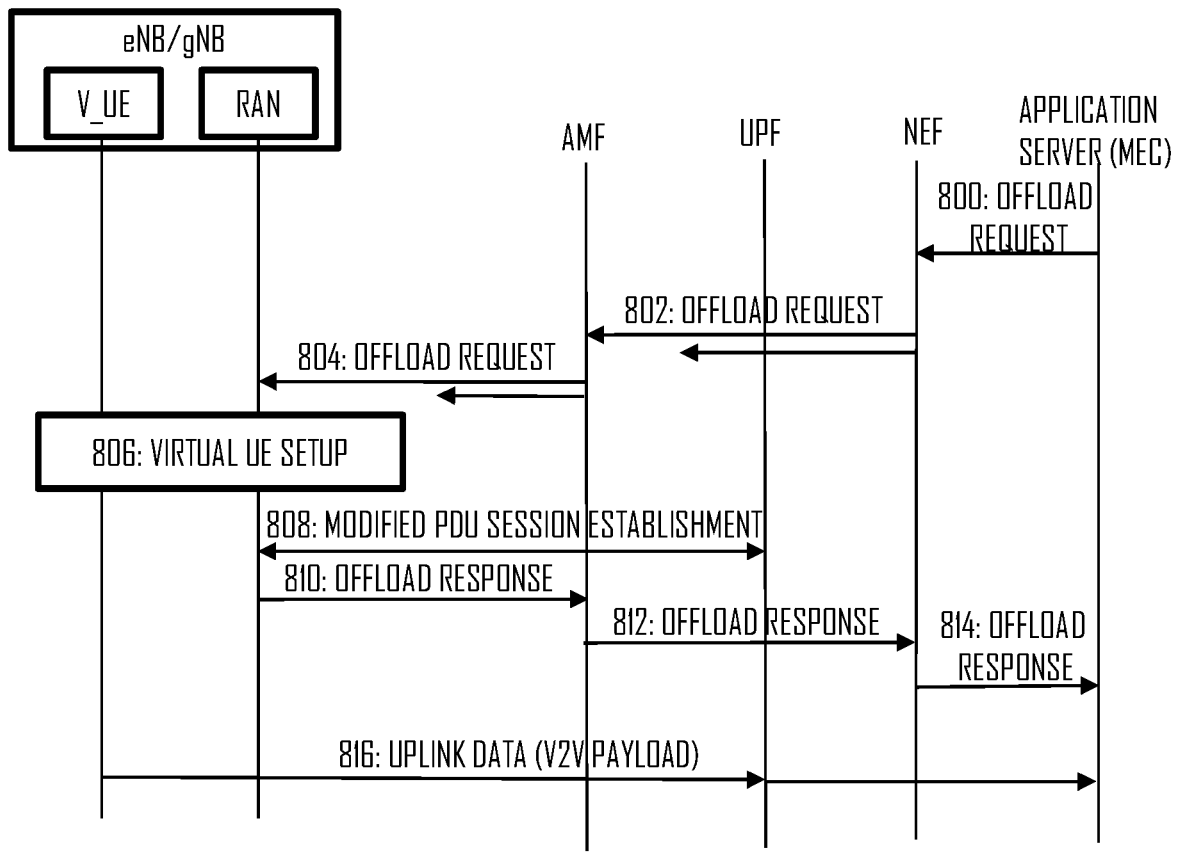
FIG. 8 illustrates a signaling diagram of a setup of V2V message capturing and forwarding according to an embodiment.

Let us then describe configuration of the access node for the capturing and associated establishment of packet routing functions between the application server and the access node according to some embodiments of the invention. FIG. 8 illustrates a signaling diagram of such a procedure. Referring to FIG. 8, the procedure may start with the application server (MEC) sending an offload request message (step 800) to the NEF. The offload request message may be called an "AF ME V2V Offload Request" message, where AF refers to application function, and ME to mobile edge. This message may contain, at least, the (IP) address of the application server and specifications of a new V2V configuration. The V2V configuration may contain a protocol stack to be used for capturing the messages, e.g. whether PC5 or 802.11p (or any combination of these) is requested to be activated. The message may further contain additional configuration information, such as a MAC identity or optionally a virtual vehicular UE and/or infrastructure identity to be used on the PC5 interface. Further configuration information contained in the request may include definitions of a geographical area from where the application server requests V2V messages to be captured.

In step 802, the NEF forwards the offload request to one or more AMFs together with at least some of the parameters for configuring the capturing. If the MEC has indicated in the offload request the geographical area from where it requires to capture the V2V messages, the NEF may use the information on the geographical area to select the AMF(s) that is/are in charge of the area. Upon receiving the forwarded offload request from the NEF, the AMF selects the RAN access nodes that are in charge of the geographical area (if requested by the application server in the V2V configuration or derived from other policies configured by an operator). The AMF forwards the request to each selected RAN access node in step 804. An access node receiving the offload request in step 804 creates/initializes the virtual UE (vehicle) logical entity, if it has not yet been created/initialized, and configures the virtual UE entity with the V2V configuration (block 806). Block 806 may comprise at least configuring the destination address of the application server to the forwarding database.

Upon establishing the virtual UE and activating at least one corresponding protocol stack in the access node, the access node may trigger a modified version of a protocol data unit (PDU) session establishment procedure, provided that the session with the UPF/P-GW has not yet been established. The modified procedure is described in greater detail in connection with FIG. 9. As an outcome of the procedure, a new PDU session is established between the access node and the UPF/P-GW is established in step 808. Upon completing the setup of the virtual UE for capturing the V2V messages, the access node acknowledges that all preparations to start forwarding the V2X payload have been completed. The access node may acknowledge the completion of the setup to the AMF (step 810), and the AMF may forward the message to the NEF (step 812). In the acknowledgement, the AMF may indicate a list of RAN access nodes where the V2V offload service has been activated to the NEF. The NEF forwards the acknowledgment to the application server in step 814.

After the above procedure, the V2X payload of the captured V2V messages is transferred from the access node to the UPF and further to the application server (step 816) through the PDU session established between the access node(s) and the UPF/P-GW.

As described above, the access node may establish a PDU session with the UPF/P-GW, or another network entity configured to carry out data packet routing functions in the cellular communication system. The established PDU session may be dedicated for transporting contents of captured V2V messages, and to forward the contents of the captured broadcast message to the application server over another PDU session established between the network entity and the application server. The PDU session may be established between the virtual UE and the network element. Since the virtual UE resides in the access node, the situation is different from a conventional scenario where a UE communicates with the access node over a radio interface. Because of the lack of radio interface, the PDU session establishment procedure may be modified with respect to the procedure used for conventional UEs connected to the access node. In an embodiment, a radio resource setup is skipped when establishing the PDU session. However, completion of the radio resource setup may still be indicated to the network element. Accordingly, the network element may carry out the establishment in the same manner as with the conventional UEs and no modifications are needed at the network element. The access node may thus fake at least some of the radio resource configuration steps of the PDU session establishment.

The procedure of FIG. 8 is described in the context of a 5G system but it can be adapted to an LTE system or to another system in a straightforward manner. For example, the MEC application server may transmit the offload request to a policy and charging rules function (PCRF) through an Rx interface. The MME may carry out at least some of the functions of AMF, e.g. selection of one or more access nodes to execute the forwarding. Furthermore, eNB may replace the gNB in the LTE system to trigger the virtual UE creation and/or configuration. As for the LTE counterpart of the FIG. 9 and the modified PDU session establishment, a modified LTE initial UE attach procedure may be implemented with modifications to skip establishment of radio access bearer(s).

Figure 9:
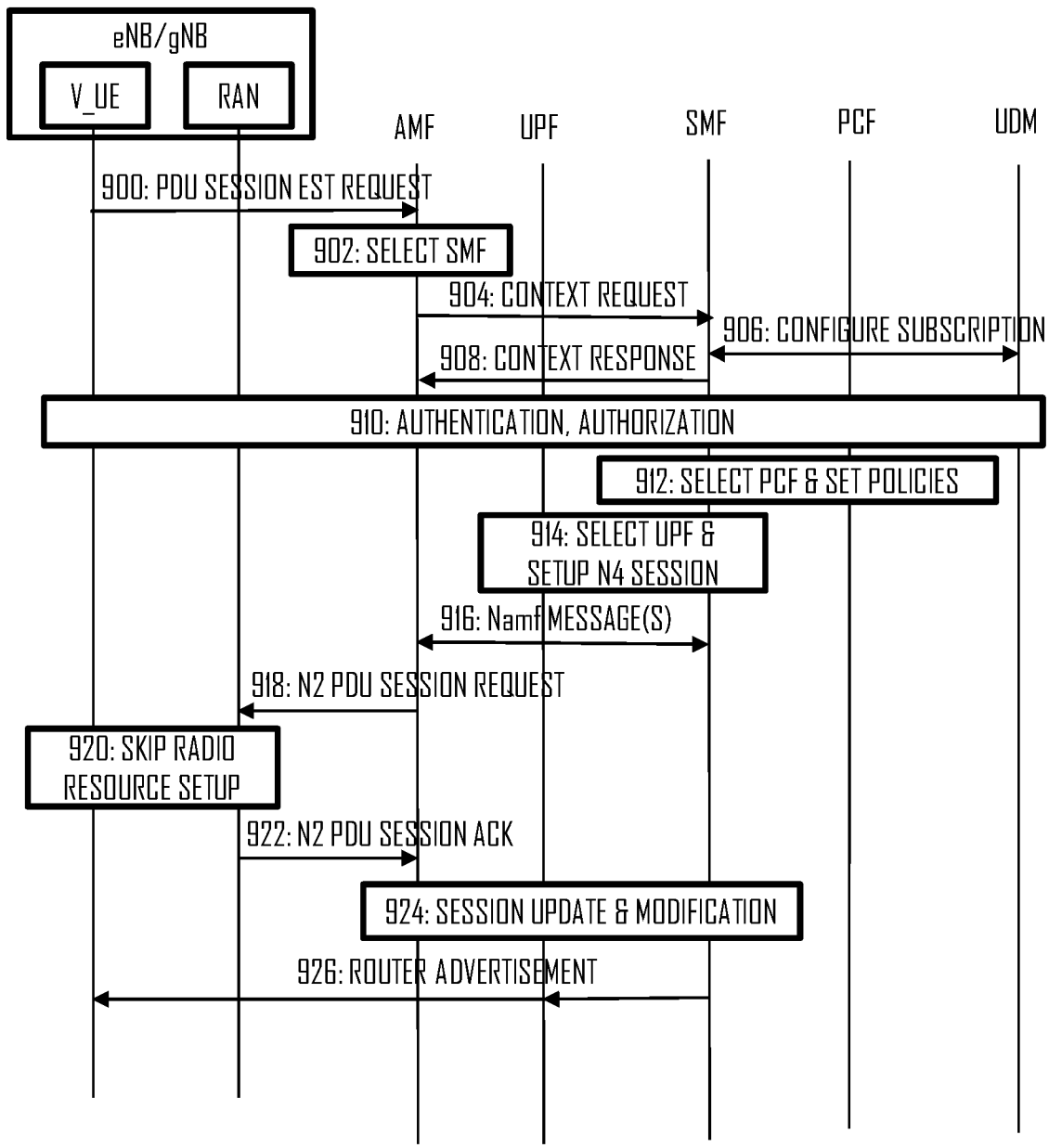
FIG. 9 illustrates a modified protocol data unit session establishment procedure for a virtual terminal device.

Let us now describe the modified PDU session establishment procedure in greater detail with reference to FIG. 9. The session establishment procedure illustrated in FIG. 9 follows a conventional PDU session establishment procedure specified in 3GPP specifications. However, certain modifications are made to the conventional procedure, and the following description focuses on the modifications. The conventional steps are not described in detail for the sake of conciseness and clarity.

Steps 900 to 918 may be carried out according to the conventional PDU session establishment procedure carried out via non-access stratum (NAS) signaling. Based on a PDU session establishment request from the UE (step 900), the AMF selects an SMF for the PDU session of the UE (block 902). If another PDU session has already been established for the UE, the same SMF may be selected. Upon selecting the SMF, the AMF sends a context establishment/update request to the selected SMF (step 904). If no PDU sessions has been established for the UE, the request may be the context establishment request, otherwise the context update request. Based on data provided by UE and received by the SMF, the SMF communicates with the UDM and PCF to get relevant information for PDU session creation (step 906 and block 912) and responds to the AMF (step 908). Authentication and authorization functions for the PDU session may be carried out in block 910. If the request is the PDU session establishment request, the SMF initiates a N4 Session establishment with the selected UPF, otherwise an active N4 Session may be modified by transmitting a modification request to the UPF. Using the N4 session establishment/modification, the SMF acquires information on a GTP tunnel from the UPF. After successful establishment of the GTP tunnel, the SMF sends Namf_Communication_N1N2MessageTransfer message with tunneling information for a N2 message and PDU session details in an N1 container (step 916) to the AMF. Upon reception of the message in step 916, the AMF sends a PDU session setup request along with N2 parameters received from the SMF to the access node (gNB) in step 918. The request may comprise further parameters such as a PDU Session identifier, a QoS profile, tunneling information, a PDU session type, etc. The access node then sets up the GTP tunnel at its end based on the parameters and information received from the AMF and sets up the end point for the tunnel at the virtual UE. In connection with this step, the access node would set up radio resources for the PDU session with the UE. Because no radio interface is present between the access node and the virtual UE, the radio resource setup is skipped (block 920). Instead, upon setting up the GTP tunnel at the virtual UE, the access node sends an N2 PDU session setup response to the AMF (step 922) to acknowledge completed setup of the PDU session at the end of the (virtual) UE. Then, the AMF informs the SMF about the successful tunnel setup by sending (block 924). If needed, the N4 session may also be updated or modified in block 924.

While the embodiment of FIG. 9 is described in the context of a 5G system, a similar procedure is utilized in the LTE systems, and the same principles of skipping/faking the radio resource configuration while acknowledging completed radio resource configuration may be applied to the LTE systems. The same principles may be applied to other cellular communication systems having similar characteristics as well.

In an embodiment, another modification to the conventional PDU session establishment procedure is in step 926 where the SMF transmits a router advertisement message providing control information on a data network beyond the core network, e.g. an address of a maximum transfer unit (MTU) top use. In a conventional procedure, the message is forwarded to the UE but now, because the UE is the virtual UE, the access node receives and terminates the message at the virtual UE.

In an embodiment, any unsubscription or deregistration of the PDU session established for the virtual UE may also be omitted.

Figure 10:
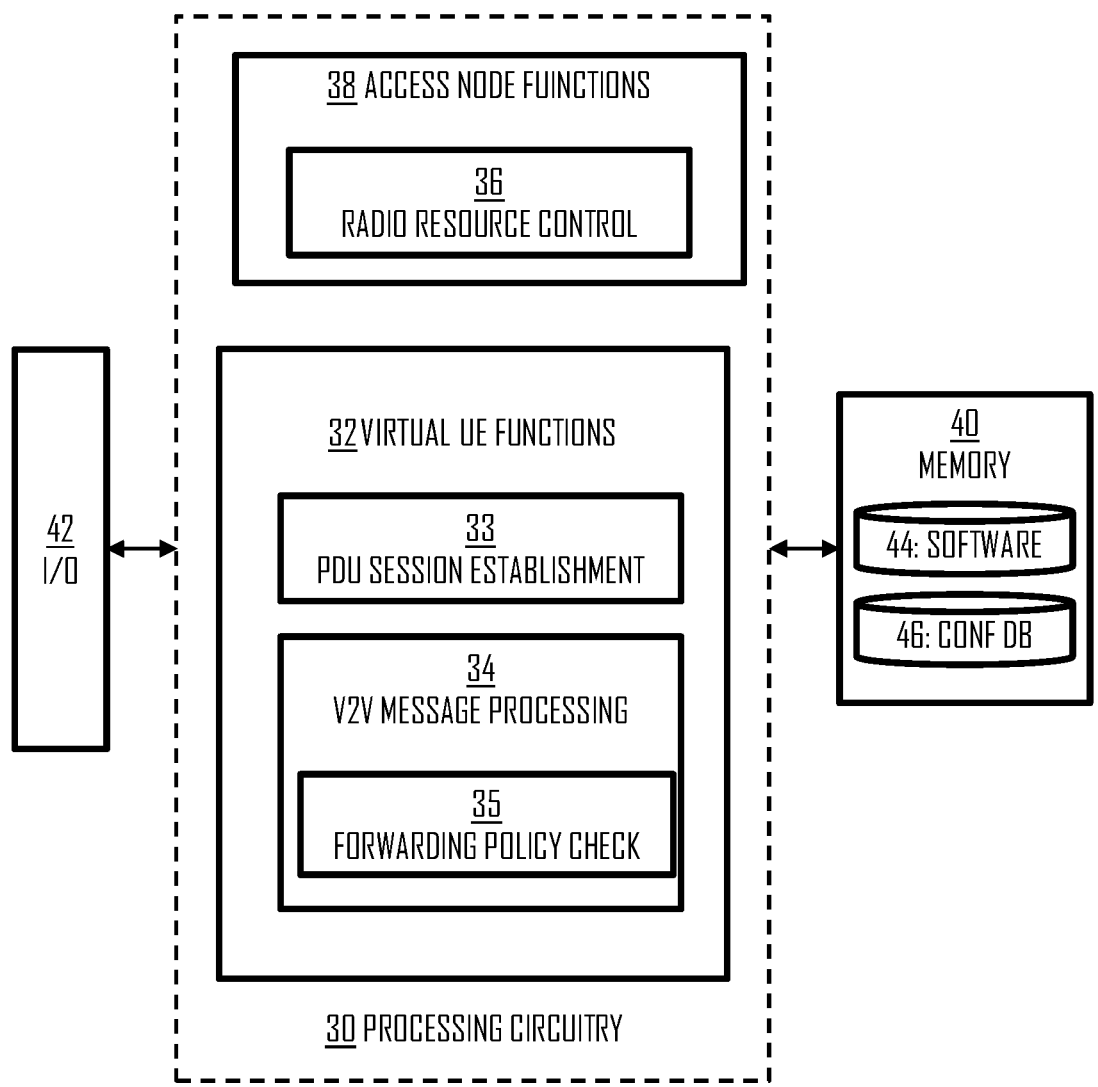
FIGS. 10 and 11 illustrates block diagrams of apparatuses according to some embodiments.

FIG. 10 illustrates an apparatus comprising at least one processor or a processing circuitry 30, and at least one memory 40 including a computer program code (software) 44, wherein the at least one memory and the computer program code (software) are configured, with the at least one processor, to cause the respective apparatus to carry out any one of the embodiments described above. The apparatus may implement the access node functions and the functions for capturing and forwarding the V2V messages and V2X payload, as described above. The apparatus may comprise the access node or be comprised to applicable to the access node. The apparatus of FIG. 11 may be an electronic device.

Referring to FIG. 10, the memory 40 may be implemented using any suitable data storage technology, such as semiconductor based memory devices, flash memory, magnetic memory devices and systems, optical memory devices and systems, fixed memory and removable memory. The memory may comprise a configuration database 46 for storing configuration parameters, e.g. the forwarding rule(s) for the captured messages.

The apparatus may further comprise a communication interface 42 comprising hardware and/or software for realizing communication connectivity according to one or more communication protocols. With respect to the functions of the access node, the communication interface 42 may provide the apparatus with a communication capability with terminal devices via a radio interface. Accordingly, the communication interface may support at least some of the functions of the radio interface, e.g. Uu interface. Furthermore, the communication interface 42 may support at least some of the functions of other interfaces over which the access node communicates with other network nodes of the RAN and/or the core network of the cellular communication system, e.g. the UPF and AMF, With respect to the functions of the virtual UE established in the access node, as described above, the communication interface may implement at least some of the following protocol layers of the virtual UE: PDCP, RLC, MAC, and physical layer. The communication interface may further establish at least lower protocol layers (L1 and L2) of the interface with the UPF/P-GW. The communication interface may thus comprise necessary digital and analog components required to implement such communications.

The processing circuitry 30 may comprise a circuitry 38 managing the access node functions, e.g. establishment and operation of RRC connections with terminal devices server by the access node comprising the apparatus. The circuitry 38 may comprise a RRC circuitry 36 managing the radio resources available to the access node. The RRC circuitry may allocate radio resources only to the access node functions 38 but not to virtual UE functions 32, not even in the embodiment where the virtual UE is also configured to carry out V2V transmissions.

The processing circuitry may further comprise a circuitry 32 carrying out the virtual UE functions, e.g. capturing, processing, and forwarding the V2V messages according to the forwarding rule(s). The circuitry 32 may comprise a PDU session establishment circuitry 33 configured to carry out the PDU session establishment for the virtual UE according to the procedure of FIG. 9, for example. The circuitry 32 may further comprise a V2V message processing circuitry 34 configuring the interface 42 to capture the V2V messages and to process the received V2V messages. In some embodiments, the V2V message processing circuitry 34 further configures the interface 42 to transmit the V2V messages. The circuitry 34 may comprise a forwarding policy check circuitry 35 configured to determine a forwarding policy for a captured message according to the embodiment of block 704, for example. The determination may comprise accessing the configuration database 46 for the forwarding rule.

Figure 11:
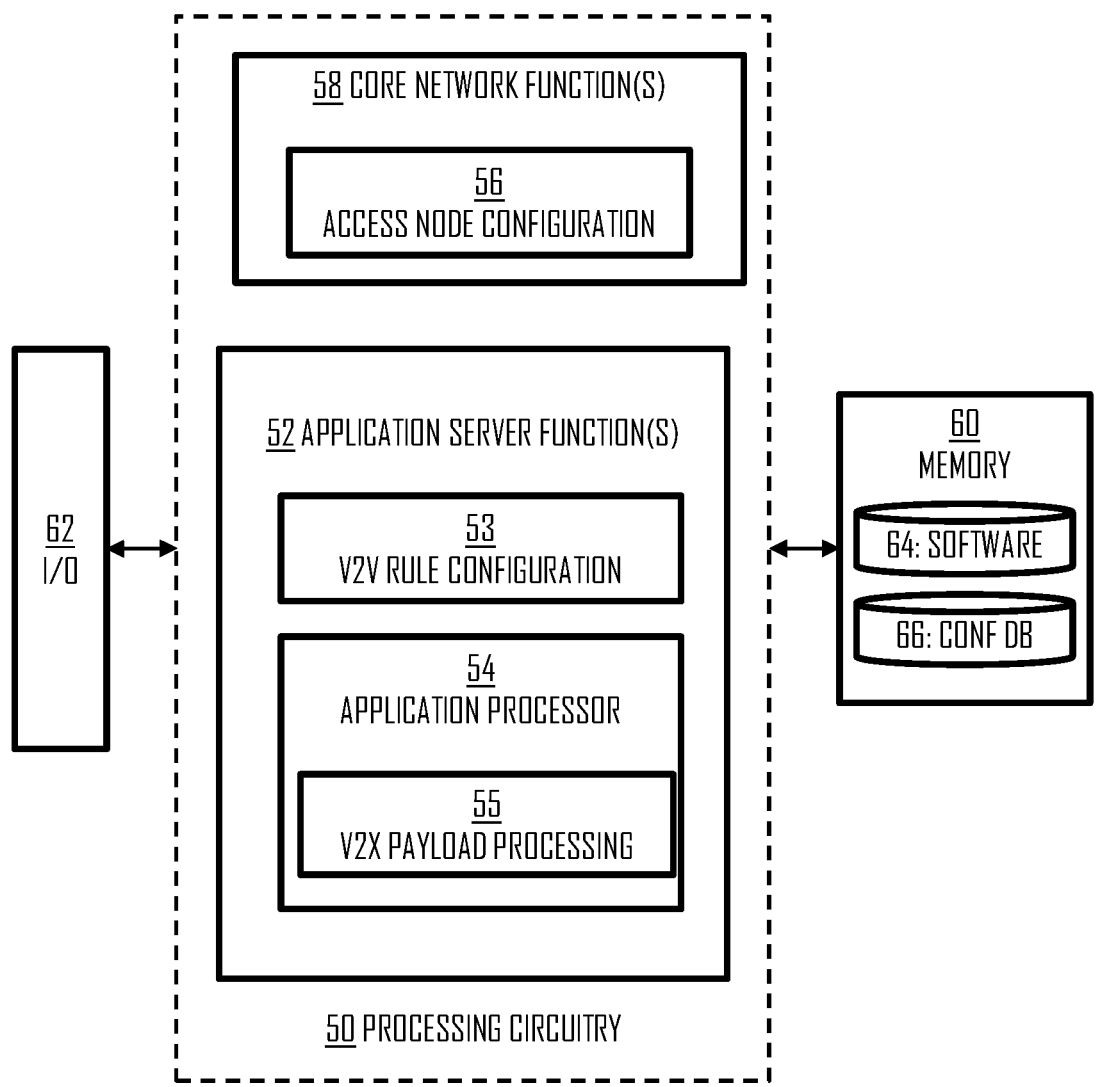

FIG. 11 illustrates an apparatus comprising at least one processor or a processing circuitry 50, and at least one memory 60 including a computer program code (software) 64, wherein the at least one memory and the computer program code (software) are configured, with the at least one processor, to cause the apparatus to carry out any one of the embodiments described above for the system that configures the access node and the virtual UE. The apparatus may implement the functions of the application server and the functions of at least some of the network elements of the core network. As a consequence, the apparatus shall be considered as a system where tasks may be distributed to different logically and physically separate entities or elements. The apparatus of FIG. 11 may be an electronic device or be realized by multiple separate electronic devices capable of communicating with one another.

Referring to FIG. 11, the memory 60 may be implemented using any suitable data storage technology, such as semiconductor based memory devices, flash memory, magnetic memory devices and systems, optical memory devices and systems, fixed memory and removable memory. The memory may comprise a configuration database 66 for storing configuration parameters, e.g. rules for processing V2X payload in the application server, context information of the virtual UE, etc.

The apparatus may further comprise a communication interface 62 comprising hardware and/or software for realizing communication connectivity according to one or more communication protocols. In the system, the communication interface may establish functions of at least some of the interfaces between the network elements of FIG. 2.

The processing circuitry 50 may comprise a circuitry 58 implementing core network functions, e.g. functions of at least some of AMF, UPF, SMF, and NEF. The circuitry 58 may comprising a circuitry 56 configuring the access node with the virtual UE configuration, e.g. the PDU session establishment configurations.

The processing circuitry 50 may comprise a circuitry 52 executing functions of the (MEC) application server. The circuitry 52 may comprise a circuitry 53 determining what type of V2X payload is needed and, accordingly, established corresponding forwarding rules for capturing and forwarding the V2V messages and respective V2X payload. The circuitry 52 further comprises an application processor 54 implementing the application layer in the application server. The application processor may comprise a V2X payload processing circuitry that processes and analyses the V2X payload and generates responsive inputs, signals, or commands based on the analysis.

In an embodiment, at least some of the functionalities of the apparatus of FIG. 11 are shared between two physically separate devices. Therefore, the apparatus may be seen to depict the operational entity comprising one or more physically separate devices for executing at least some of the processes described with respect to the application server and the UPF, for example. The apparatus may generate a virtual network combining hardware and software network resources and network functionality into a single, software-based administrative entity, a virtual network. The virtual network may employ physical resources of the core network, radio access network, application server(s), and/or even the terminal device(s). In other words, some or all computation may be outsourced even to the terminal device(s), if such is considered feasible from the perspective of implementation. Network virtualization may involve platform virtualization, often combined with resource virtualization. Network virtualization may be categorized as external virtual networking which combines many networks, or parts of networks, into a server computer or a host computer. External network virtualization is targeted to optimized network sharing. Another category is internal virtual networking which provides network-like functionality to the software containers on a single system.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising: at least one processor; and at least one memory including a computer program code, wherein the at least one memory and the computer program code are configured, with the at least one processor, to cause the apparatus to perform: operating functions of an access node of a cellular communication system; establishing a virtual terminal device in the access node; capturing, by the virtual terminal device, a broadcast vehicle-to-vehicle message transmitted by a vehicular terminal device; forwarding by the virtual terminal device, according to a forwarding rule, contents of the captured broadcast vehicle-to-vehicle message to an application server via a network of the cellular communication system; and establishing a protocol data unit (PDU) session with a user plane function of the cellular communication system, wherein the protocol data unit (PDU) session is dedicated for transporting captured broadcast vehicle-to-vehicle messages of vehicular terminal devices, and to forward the contents of the captured broadcast vehicle-to-vehicle message to the application server over the protocol data unit (PDU) session.

2. The apparatus of claim 1, wherein the virtual terminal device is configured to process different protocol messages than the access node.

3. The apparatus of claim 1, wherein the virtual terminal device supports at least one of an IEEE 802.11p based protocol and a 3GPP PC5-based protocol.

4. The apparatus of claim 1, wherein the virtual terminal device comprises a first protocol stack for capturing the broadcast vehicle-to-vehicle message and a second protocol stack for communicating with the application server.

5. The apparatus of claim 1, wherein the at least one memory and the computer program code are configured, with the at least one processor, to cause the apparatus to remove at least one header of the captured broadcast vehicle-to-vehicle message, to determine a destination address for the contents of the captured broadcast vehicle-to-vehicle message from a forwarding database storing the forwarding rule, and to generate an internet protocol packet comprising the contents of the captured broadcast vehicle-to-vehicle message as a payload and further comprising an internet protocol header comprising the determined destination address.

6. The apparatus of claim 1, wherein the at least one memory and the computer program code are configured, with the at least one processor, to cause the apparatus to establish a protocol data unit, PDU, session with a user plane function of the cellular communication system, wherein the PDU session is dedicated for transporting captured broadcast vehicle-to-vehicle messages of vehicular terminal devices, and to forward the contents of the captured broadcast vehicle-to-vehicle message to the application server over the PDU session.

7. The apparatus of claim 6, wherein the at least one memory and the computer program code are configured, with the at least one processor, to cause the apparatus to skip performing radio resource setup when establishing the PDU session but to indicate to the user plane function that the radio resource setup has been completed.

8. The apparatus of claim 1, wherein the at least one memory and the computer program code are configured, with the at least one processor, to cause the apparatus to receive configuration data comprising at least said forwarding rule and to set up said capturing and forwarding according to the configuration data.

9. The apparatus of claim 8, wherein the configuration data further specifies at least one limitation to broadcast vehicle-to-vehicle messages to be captured and forwarded, and wherein the at least one memory and the computer program code are configured, with the at least one processor, to cause the apparatus to forward only broadcast vehicle-to-vehicle messages complying with the at least one limitation and to not forward a broadcast vehicle-to-vehicle message not complying with the at least one limitation.

10. The apparatus of claim 1, wherein the at least one memory and the computer program code are configured, with the at least one processor, to cause the apparatus to receive payload data from the application server and to transmit the payload data in a vehicle-to-vehicle broadcast message.

11. A system, comprising: at least one processor; and at least one memory including a computer program code, wherein the at least one memory and the computer program code are configured, with the at least one processor, to cause the apparatus to perform: generating, by a cellular communication system, a forwarding rule defining how to forward contents of captured broadcast vehicle-to-vehicle messages to an application server via a network of a-the cellular communication system; configuring a virtual terminal device in an access node of the cellular communication system to forward the contents of the captured broadcast vehicle-to-vehicle messages to the application server by using the forwarding rule; and receiving, from the virtual terminal device in the access node, contents of a broadcast vehicle-to-vehicle message transmitted by a vehicular terminal device and captured by the virtual terminal device in the access node.

12. A method, comprising: establishing a virtual terminal device in an access node of a cellular communication system; capturing, by the virtual terminal device in the access node of the cellular communication system, a broadcast vehicle-to-vehicle message transmitted by a vehicular terminal device; forwarding, by the virtual terminal device according to a forwarding rule, contents of the captured broadcast vehicle-to-vehicle message to an application server via a network of the cellular communication system; and establishing a protocol data unit (PDU) session with a user plane function of the cellular communication system, wherein the protocol data unit (PDU) session is dedicated for transporting captured broadcast vehicle-to-vehicle messages of vehicular terminal devices, and to forward the contents of the captured broadcast vehicle-to-vehicle message to the application server over the protocol data unit (PDU) session.

13. A method carded out in a cellular communication system, the method comprising: generating, by the cellular communication system, a forwarding rule defining how to forward contents of captured broadcast vehicle-to-vehicle messages to an application server via a network of the cellular communication system; configuring a virtual terminal device in an access node of the cellular communication system to forward the contents of the captured broadcast vehicle-to-vehicle messages to the application server by using the forwarding rule; and receiving, from the virtual terminal device in the access node, contents of a broadcast vehicle-to-vehicle message transmitted by a vehicular terminal device and captured by the virtual terminal device in the access node.

14. A computer program comprising a computer program code embodied on a non-transitory distribution medium readable by a computer that, when executed by the computer, configures the computer carry out a computer process comprising: establishing a virtual terminal device in an access node of a cellular communication system; capturing, by the virtual terminal device in the access node of the cellular communication system, a broadcast vehicle-to-vehicle message transmitted by a vehicular terminal device; forwarding by the virtual terminal device, according to a forwarding rule, contents of the captured broadcast vehicle-to-vehicle message to an application server via a network of the cellular communication system; and establishing a protocol data unit session with a user plane function of the cellular communication system, wherein the protocol data unit session is dedicated for transporting captured broadcast vehicle-to-vehicle messages of vehicular terminal devices, and to forward the contents of the captured broadcast vehicle-to-vehicle message to the application server over the protocol data unit session.

15. A computer program comprising a computer program code embodied on a non-transitory distribution medium readable by a computer that, when executed by the computer, configures the computer carry out a computer process comprising: generating, by a cellular communication system, a forwarding rule defining how to forward contents of captured broadcast vehicle-to-vehicle messages to an application server via a network of the cellular communication system; configuring a virtual terminal device in an access node of the cellular communication system to forward the contents of the captured broadcast vehicle-to-vehicle messages to the application server by using the forwarding rule; and receiving, from the virtual terminal device in the access node, contents of a broadcast vehicle-to-vehicle message transmitted by a vehicular terminal device and captured by the virtual terminal device in the access node.

* * * * *